(12) United States Patent
Cruickshank et al.

(10) Patent No.: US 9,377,145 B2
(45) Date of Patent: Jun. 28, 2016

(54) QUICK CONNECT COUPLING

(71) Applicant: Parker-Hannifin Corporation, Cleveland, OH (US)

(72) Inventors: Brian W. Cruickshank, Spring, TX (US); Bruce Kasten, Cypress, TX (US); Harsh Rajnikant Parekh, Houston, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 114 days.

(21) Appl. No.: 14/210,569

(22) Filed: Mar. 14, 2014

(65) Prior Publication Data

US 2014/0261818 A1     Sep. 18, 2014

Related U.S. Application Data

(60) Provisional application No. 61/781,227, filed on Mar. 14, 2013, provisional application No. 61/859,813, filed on Jul. 30, 2013.

(51) Int. Cl.
| | | |
|---|---|---|
| *F16L 37/23* | (2006.01) | |
| *F16L 37/248* | (2006.01) | |
| *F16K 31/50* | (2006.01) | |

(52) U.S. Cl.
CPC ............... *F16L 37/248* (2013.01); *F16L 37/23* (2013.01); *F16K 31/504* (2013.01); *Y10T 137/9029* (2015.04)

(58) Field of Classification Search
CPC ....... F16L 37/23; F16L 37/248; F16L 25/009; Y10T 137/9029; F16K 31/50; F16K 31/504
USPC ............................................ 251/149.6, 149.9
See application file for complete search history.

(56) References Cited

U.S. PATENT DOCUMENTS

| | | | | |
|---|---|---|---|---|
| 1,484,740 | A | * | 2/1924 | Rubino ......................... 251/264 |
| 1,799,433 | A | * | 4/1931 | Murphy ........................ 137/798 |
| 1,859,251 | A | * | 5/1932 | Brown .......................... 285/101 |
| 1,890,011 | A | * | 12/1932 | Wirz et al. ...................... 285/95 |
| 2,252,923 | A | * | 8/1941 | Granetz ........................ 251/159 |
| 2,459,477 | A | * | 1/1949 | Schuyver ................... 251/149.6 |
| 2,503,495 | A | * | 4/1950 | Koester ...................... 251/149.6 |
| 3,836,117 | A | * | 9/1974 | Panicali ........................ 251/351 |
| 4,240,466 | A |   | 12/1980 | Herzan et al. |
| 4,552,333 | A | * | 11/1985 | Niemi ........................ 251/149.9 |

(Continued)

FOREIGN PATENT DOCUMENTS

| | | |
|---|---|---|
| WO | 2012/134518 | 10/2012 |
| WO | 2013/085573 | 6/2013 |

*Primary Examiner* — John K Fristoe, Jr.
*Assistant Examiner* — David Colon Morales
(74) *Attorney, Agent, or Firm* — Renner, Otto, Boisselle & Sklar, LLP

(57) ABSTRACT

Provided is a coupler including female and male couplers configured to be coupled together. The female coupler includes one or more detents and a release valve having a release valve member that is movable to an open position to allow for venting of fluid from a cavity in the female coupler to an area outside the coupler, and the male coupler includes a detent recess into which the one or more detents of the female coupler are urged radially inwardly into to couple the female and male couplers. By eliminating a threaded connection between the male and female couplers, the couplers prevent leakage of fluid and/or separation of the couplers due to vibration during use.

20 Claims, 7 Drawing Sheets

(56) References Cited

U.S. PATENT DOCUMENTS

| | | | | |
|---|---|---|---|---|
| 4,611,662 | A | * | 9/1986 | Harrington .................... 166/339 |
| 4,844,123 | A | * | 7/1989 | Wick ............................ 137/322 |
| 4,986,502 | A | * | 1/1991 | Ceroke ......................... 251/216 |
| 5,445,358 | A | * | 8/1995 | Anderson .................. 251/149.6 |
| 5,451,031 | A | * | 9/1995 | Purvis et al. ................. 251/89.5 |
| 5,979,868 | A | * | 11/1999 | Wu et al. .................... 251/149.6 |
| 6,095,190 | A | * | 8/2000 | Wilcox et al. ............ 137/614.04 |
| 6,237,631 | B1 | * | 5/2001 | Giesler et al. ............ 137/614.04 |
| 6,938,636 | B1 | | 9/2005 | Nimberger |
| 7,213,845 | B2 | * | 5/2007 | Sato et al. ....................... 285/86 |
| 7,488,006 | B2 | | 2/2009 | Dahms et al. |
| 8,196,606 | B2 | * | 6/2012 | Kitagawa ................. 137/614.04 |
| 2007/0209718 | A1 | * | 9/2007 | Hansen ......................... 137/614 |

* cited by examiner

QUICK CONNECT COUPLING

This application claims the benefit of U.S. Provisional Application No. 61/781,227 filed Mar. 14, 2013 and U.S. Provisional Application No. 61/859,813 filed Jul. 30, 2013, which are hereby incorporated herein by reference.

FIELD OF INVENTION

The present invention relates generally to couplings, and more particularly to quick connect/disconnect couplings for use with anhydrous ammonia devices.

BACKGROUND

Anhydrous ammonia may be applied to soil by farmers as a fertilizer. Farmers often use a nurse tank containing pressurized liquid anhydrous ammonia as a source. The nurse tank may be provided on a cart that is transported by a farm vehicle across a field while the anhydrous ammonia is distributed to the soil via a tool bar connected to the nurse tank. To connect the nurse tank and the tool bar, one or more hoses may be used. The one or more hoses may be coupled to the nurse tank, and more particularly to a withdrawal valve of the nurse tank and/or the tool bar in any suitable manner, such as by couplers configured to be threaded together, such as acme couplers.

SUMMARY OF INVENTION

The present invention provides a coupler including female and male couplers configured to be coupled together. The female coupler includes one or more detents and a release valve having a release valve member that is movable to an open position to allow for venting of fluid from a cavity in the female coupler to an area outside the coupler, and the male coupler includes a detent recess into which the one or more detents of the female coupler are urged radially inwardly into to couple the female and male couplers. By eliminating a threaded connection between the male and female couplers, the couplers prevent leakage of fluid and/or separation of the couplers due to vibration during use.

According to one aspect of the invention, a female coupler is provided that includes a body having axially inner and axially outer ends, an axially extending cavity for receiving a male coupler at the inner end, a plurality of circumferentially spaced openings extending through a wall of the body near the inner end, and a passage extending through the wall of the body near the outer end, a release sleeve surrounding the body at the circumferentially spaced openings and being movable between first and second positions relative to the body, a plurality of detents respectively received in the plurality of circumferentially spaced openings and being urged radially inwardly by the release sleeve when the release sleeve is in the first position and being movable radially outwardly when the release sleeve is in the second position, and a release valve having a release valve member movable relative to a valve seat in the body, the release valve member being movable between a closed position blocking communication between the axially extending cavity and the passage and an open position allowing for venting of fluid from the axially extending cavity to the passage.

The release valve member may serve as a stop to prevent the release sleeve from being moved to the second position when the release valve member is in the closed position.

When the release valve member is in the open position, the release sleeve may be movable to the second position.

The release valve member may include a first portion having a first diameter and a second portion having a second diameter greater than the first diameter, and the release sleeve includes a slot having a width greater than the first diameter but less than the second diameter.

When the release valve member is in the closed position the second portion may serve as a stop to prevent the release sleeve from being moved to the second position, and when the release valve member is in the open position the slot receives the first portion as the release sleeve moves to the second position.

The coupler may further include a disc that serves as the valve seat.

The release valve member may include threads that mate with threads in an opening in the body.

The passage may extend through the wall of the body perpendicular to a longitudinal axis of the body.

The coupler may further include a seal disposed in a seal groove in the axially extending cavity, and a sliding sleeve disposed in the axially extending cavity, wherein the sleeve is biased in a first position substantially covering the seal and movable to a second position by the male coupler to uncover the seal.

The coupler may further include a retainer disposed in a groove in the sliding sleeve, wherein the retainer retains the sliding sleeve in the cavity.

The body of the female coupler may include a ledge in the axially extending cavity, and wherein the retainer abuts the ledge in the first position to retain the sliding sleeve in the cavity.

The coupler may further include a resilient member biasing the sleeve in the first position.

A male coupler in combination with the female coupler, the male coupler including a body having an axially inner end configured to be received in the cavity of the female coupler and an axially outer end, an axially extending cavity, a detent recess on an outer surface of the body near the axially inner end into which the detents of the female coupler are urged radially inwardly into to couple the female and male couplers, and an anti-rotate element to constrain the male coupler against rotation with respect to the female coupler.

The body of the female coupler may include a notch at the inner end that receives the anti-rotate element.

The anti-rotate element may be movable to an intermediate position in the notch between a locked position and a released position, and wherein separation of the male coupler from the female coupler due to pressure in the axially extending cavities is prevented when in the intermediate position.

In the intermediate position fluid in the axially extending cavities may be bled through the notch.

In the locked position the male coupler may be constrained against rotation and in the intermediate position the male coupler is prevented from moving away from the female coupler in a direction parallel to a longitudinal axis of the male coupler.

The notch may include multiple portions through which the anti-rotate element is configured to be moved through.

The notch may be substantially z-shaped.

The anti-rotate element may project radially outwardly from the body of the male coupler.

According to another aspect of the invention, a female coupler is provided that includes a body having axially inner and axially outer ends, an axially extending cavity for receiving a male coupler at the inner end, a seal disposed in a seal groove in the axially extending cavity, and a sliding sleeve disposed in the axially extending cavity, wherein the sleeve is biased in a first position substantially covering the seal and movable to a second position by the male coupler during insertion of the male coupler to uncover the seal.

The female coupler may further include a retainer disposed in a groove in the sliding sleeve, wherein the retainer retains the sliding sleeve in the cavity The body of the female coupler may include a ledge in the axially extending cavity, and wherein the retainer abuts the ledge in the first position to retain the sliding sleeve in the cavity.

The female coupler may further include a resilient member biasing the sleeve in the first position.

A male coupler in combination with the female coupler, the male coupler including a body having an axially inner end configured to be received in the cavity of the female coupler and an axially outer end, an axially extending cavity, and a detent recess on an outer surface of the body near the axially inner end into which the detents of the female coupler are urged radially inwardly into to couple the female and male couplers.

The male coupler may further include an anti-rotate element to constrain the male coupler against rotation with respect to the female coupler.

The body of the female coupler may include a notch at the inner end that receives the anti-rotate element.

The anti-rotate element may be movable to an intermediate position in the notch between a locked position and a released position, and wherein separation of the male coupler from the female coupler due to pressure in the axially extending cavities is prevented when in the intermediate position.

In the intermediate position fluid in the axially extending cavities may be bled through the notch.

In the locked position the male coupler may be constrained against rotation and in the intermediate position the male coupler is prevented from moving away from the female coupler in a direction parallel to a longitudinal axis of the male coupler The notch may include multiple portions through which the anti-rotate element is configured to be moved through.

The notch may be substantially z-shaped.

The anti-rotate element may project radially outwardly from the body of the male coupler.

According to still another aspect of the invention, a coupler including female and male couplers configured to be coupled together is provided. The female coupler includes a body having axially inner and axially outer ends, an axially extending cavity for receiving the male coupler at the inner end, and a plurality of circumferentially spaced openings extending through a wall of the body near the inner end, a release sleeve surrounding the body at the circumferentially spaced openings and being movable between first and second positions relative to the body, and a plurality of detents respectively received in the plurality of circumferentially spaced openings and being urged radially inwardly by the release sleeve when the release sleeve is in the first position and being movable radially outwardly when the release sleeve is in the second position. The male coupler includes a body having an axially inner end configured to be received in the cavity of the female coupler and an axially outer end, an axially extending cavity, a detent recess on an outer surface of the body near the axially inner end into which the detents of the female coupler are urged radially inwardly into to couple the female and male couplers, and an anti-rotate element to constrain the male coupler against rotation with respect to the female coupler.

The body of the female coupler may include a notch at the inner end that receives the anti-rotate element.

The anti-rotate element may be movable to an intermediate position in the notch between a locked position and a released position, and wherein separation of the male coupler from the female coupler due to pressure in the axially extending cavities is prevented when in the intermediate position.

In the intermediate position fluid in the axially extending cavities may be bled through the notch.

In the locked position the male coupler may be constrained against rotation and in the intermediate position the male coupler is prevented from moving away from the female coupler in a direction parallel to a longitudinal axis of the male coupler.

The notch may include multiple portions through which the anti-rotate element is configured to be moved through.

The notch may be substantially z-shaped.

The anti-rotate element may project radially outwardly from the body of the male coupler.

The foregoing and other features of the invention are hereinafter described in greater detail with reference to the accompanying drawings.

DETAILED DESCRIPTION

The principles of the present application have particular application to quick connect/disconnect couplings for connecting a source of fluid, such as liquid anhydrous ammonia, to a tool bar to distribute the fluid to soil, and thus will be described below chiefly in this context. It will of course be appreciated, and also understood, that the principles of the invention may be useful in other fluid coupling applications where it is desirable to make a connection without the use of tools.

Figure 1:
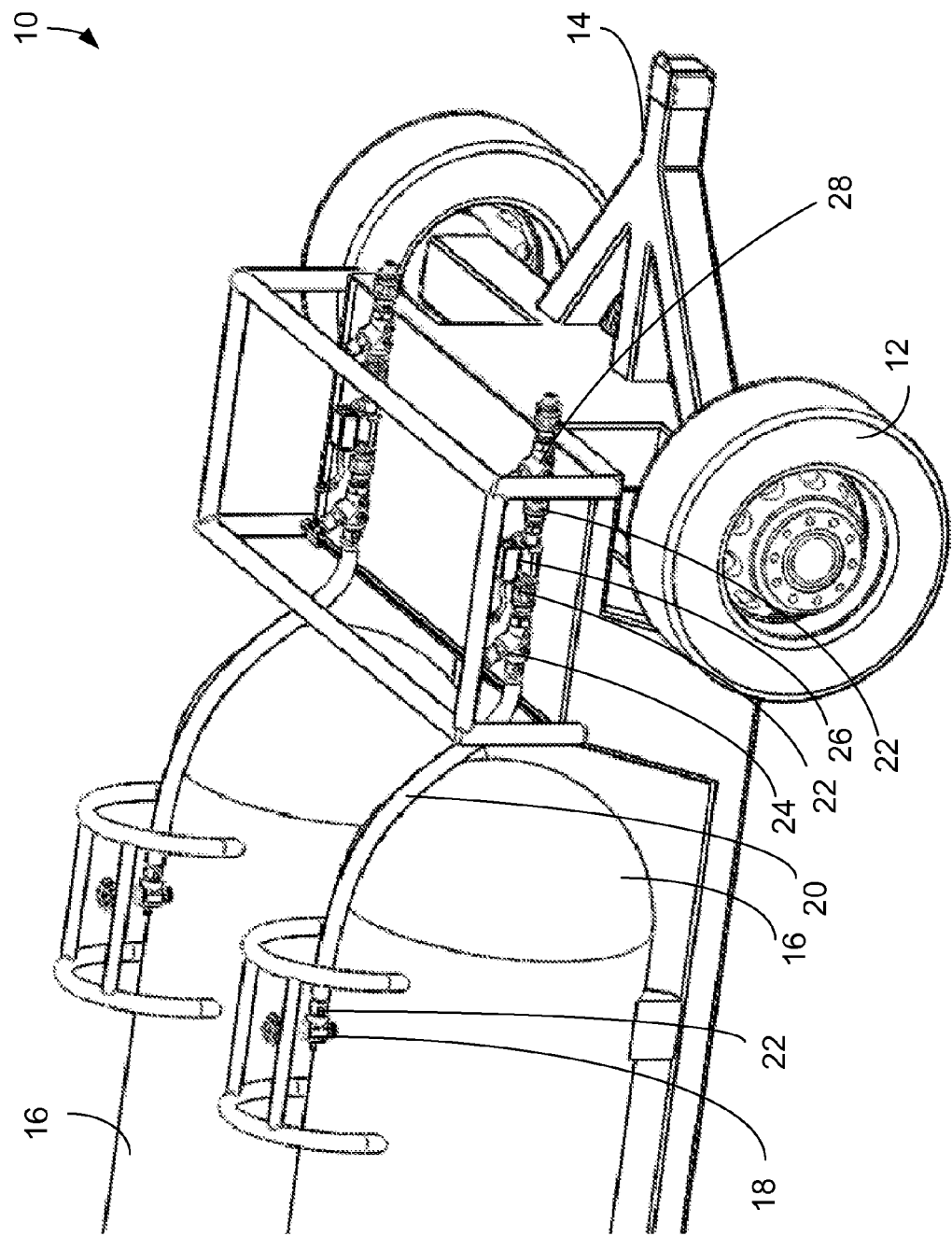
FIG. 1 is a perspective view of a cart having tanks with valves coupled to hoses via exemplary couplers according to the invention.

Turning now to FIG. 1, an exemplary anhydrous ammonia cart is illustrated generally at reference numeral 10. The cart 10 may include a plurality of wheels 12, a hitch 14 configured to couple to tool bar that couples to a farm vehicle, and a plurality of nurse tanks 16 containing pressurized liquid anhydrous ammonia. Each tank 16 includes a withdrawal valve 18 through which the liquid exits the tank. The withdrawal valves 18 are coupled to respective hoses 20 using an exemplary quick connect/disconnect coupling 22 that will be described in detail below. The flexible hose 20 may be coupled to another suitable valve 24, which may be coupled to a shut off valve 26 using the coupling 22. The flow meter 26 may then be coupled to a further suitable valve 28 using the coupling 22. The valve 28 may be coupled to a hose (not shown), for example by the coupling 22, and an end of the hose configured to be coupled to the tool bar may be coupled to one of a male or female coupler of the coupling 22.

The couplings 22 allow the various components to be quickly connected and disconnected without using a threaded connection. By eliminating the threaded connection between male and female couplers of the coupling 22, leakage of fluid and/or separation of the couplers due to vibration during use are prevented. The couplings 22 also allow for the length of a hose to be efficiently changed, thereby reducing or eliminating leakage that results from using an incorrect length of hose.

Figure 2:
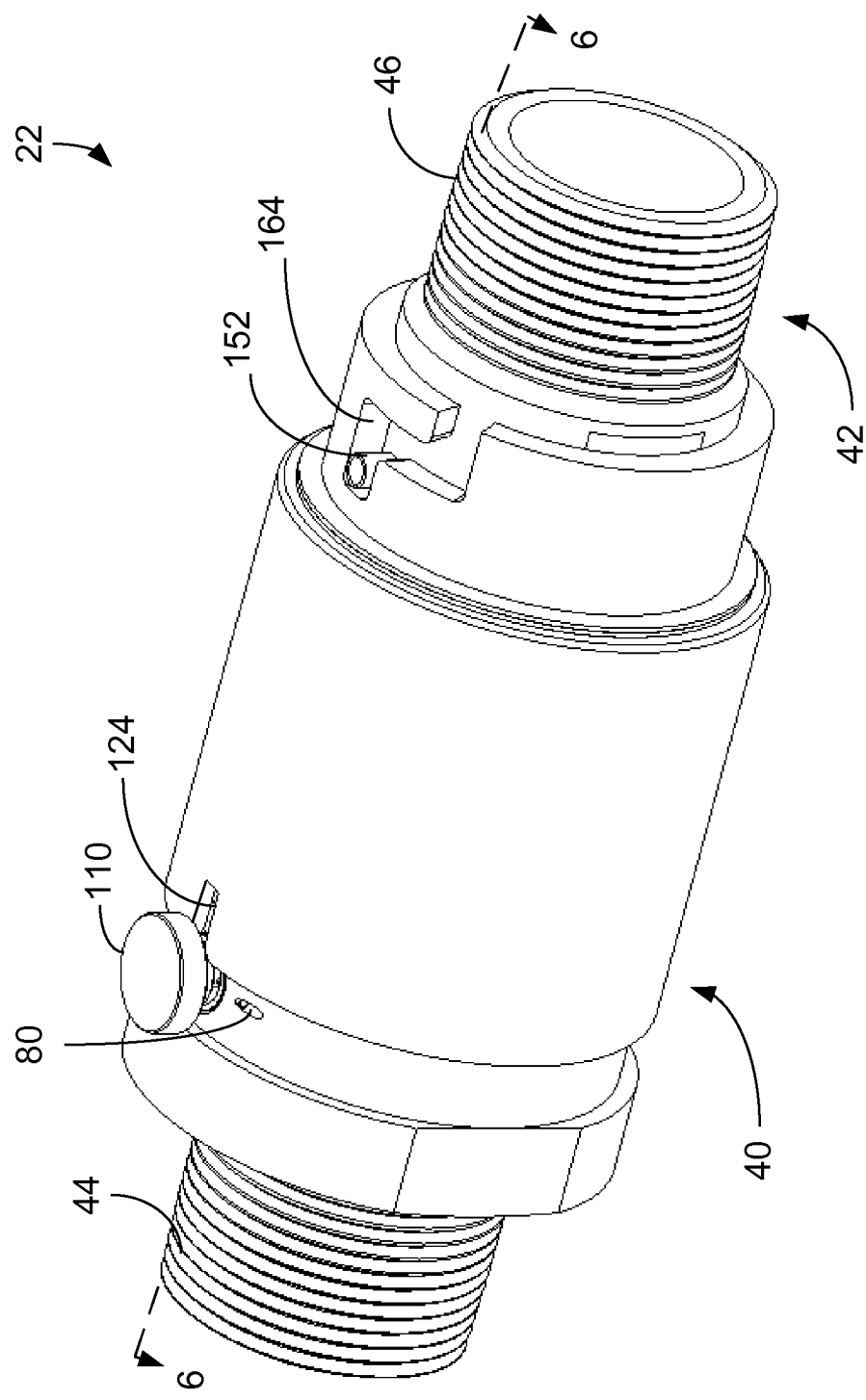
FIG. 2 is a perspective view of the exemplary coupler according to the invention having male and female couplers in an engaged position.
Figure 3:
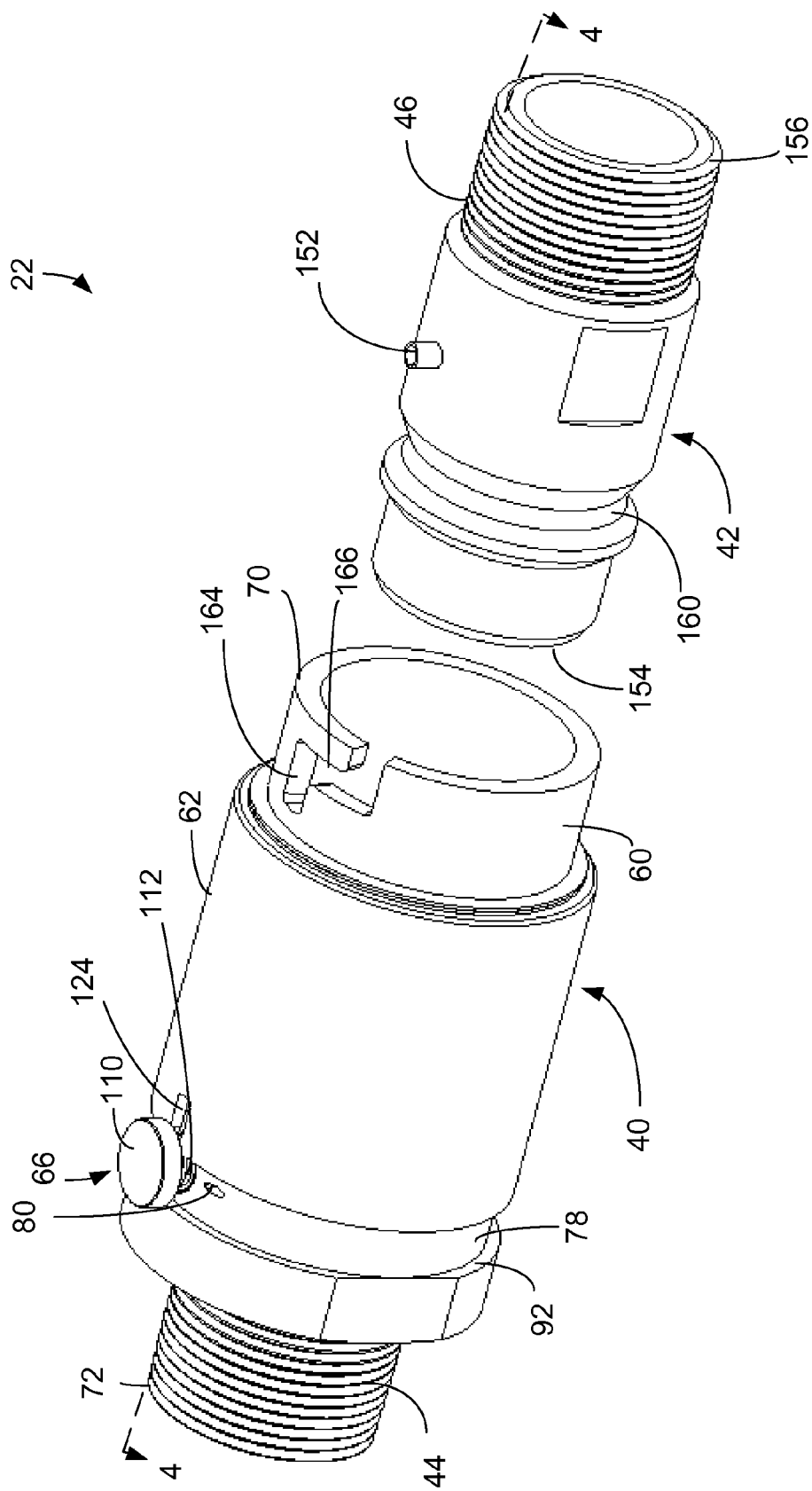
FIG. 3 is a perspective view of the exemplary coupler having male and female couplers in a disengaged position.
Figure 7:
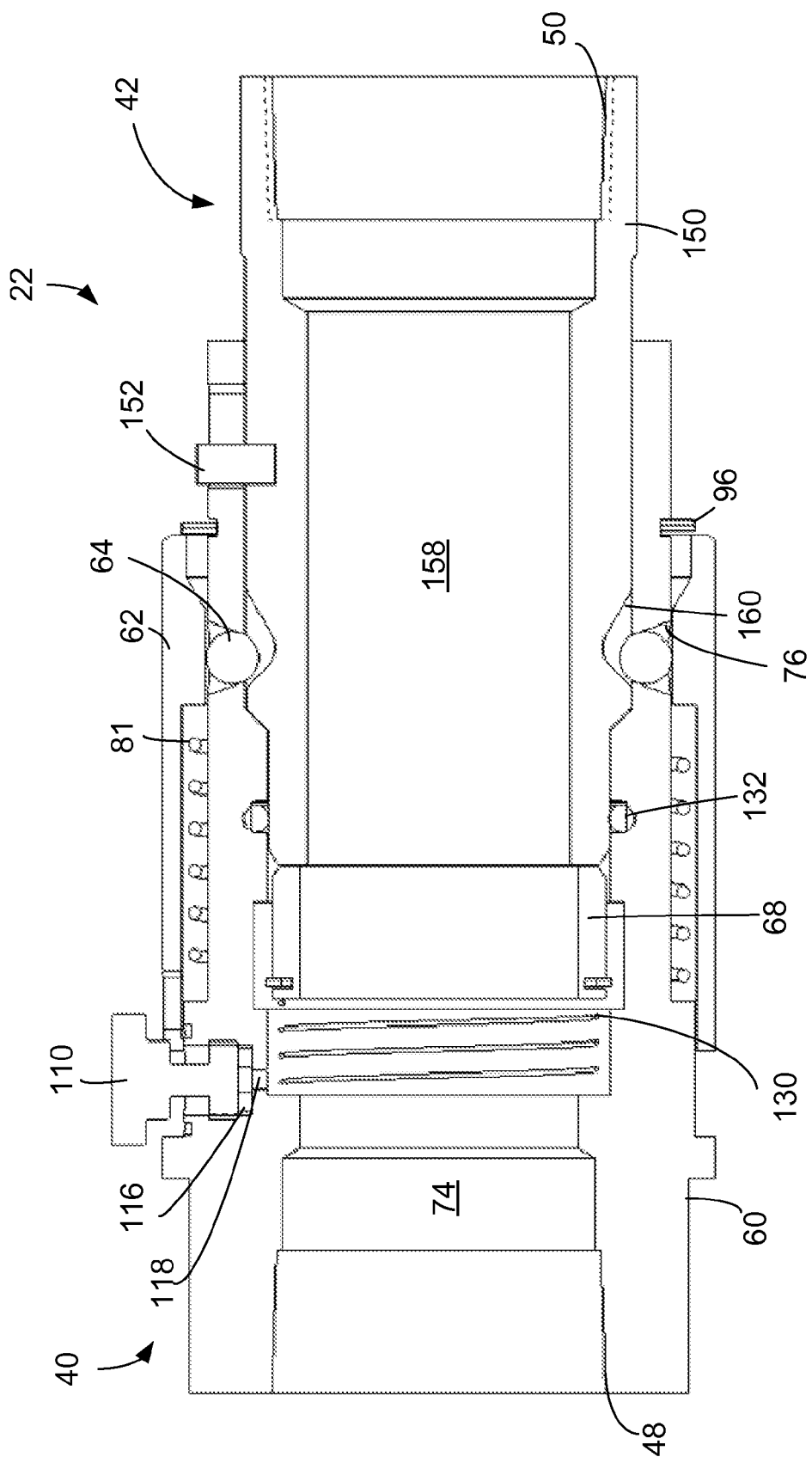
FIG. 7 is a cross-sectional view of another exemplary coupler according to the invention having male and female couplers in the engaged position.

Referring now to FIGS. 2 and 3, the exemplary quick connect/disconnect coupling 22 will be discussed in detail. The coupling 22 includes a female coupler 40 and a male coupler 42 that may be connected to provide liquid from one of the tanks 16 to the hose 20, for example. The female and male couplers 40 and 42 include threaded ends 44 and 46, respectively, which may be coupled, for example, to the withdrawal valve 18 and the flexible hose 20, respectively. It will be appreciated that the ends 44 and 46 may be any suitable ends for either permanently or removably coupling the female and male couplers 40 and 42 to respective components. For example, the female and male couplers 40 and 42 may have female ends 48 and 50 (FIG. 7), respectively, having threads on an inner surface for coupling to a threaded male fitting, for example.

Figure 4:
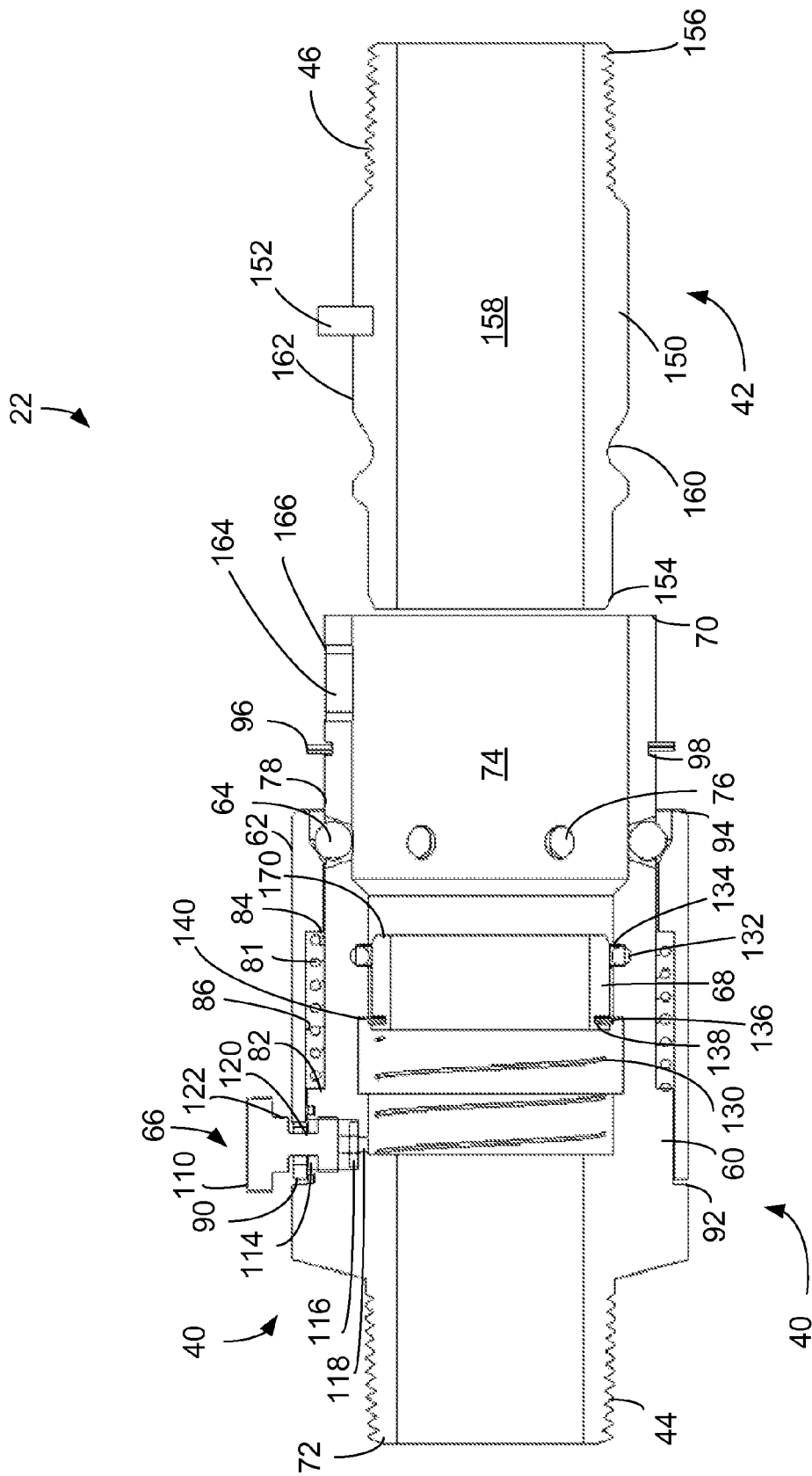
FIG. 4 is a cross-sectional view of the exemplary coupler taken about line 4-4 in FIG. 3.

With continued reference to FIGS. 2 and 3 along with FIG. 4, the female coupler 40 includes a body 60, a release sleeve 62, a plurality of detents 64, a release valve 66, and a sliding sleeve 68. The body 60 has axially inner and axially outer ends 70 and 72, an axially extending cavity 74 for receiving the male coupler 42 at the axially inner end 70, a plurality of circumferentially spaced openings 76 extending through a wall 78 of the body 60 near the inner end 70, and a passage 80 extending through the wall 78 of the body 60 near the outer end 72.

Figure 6:
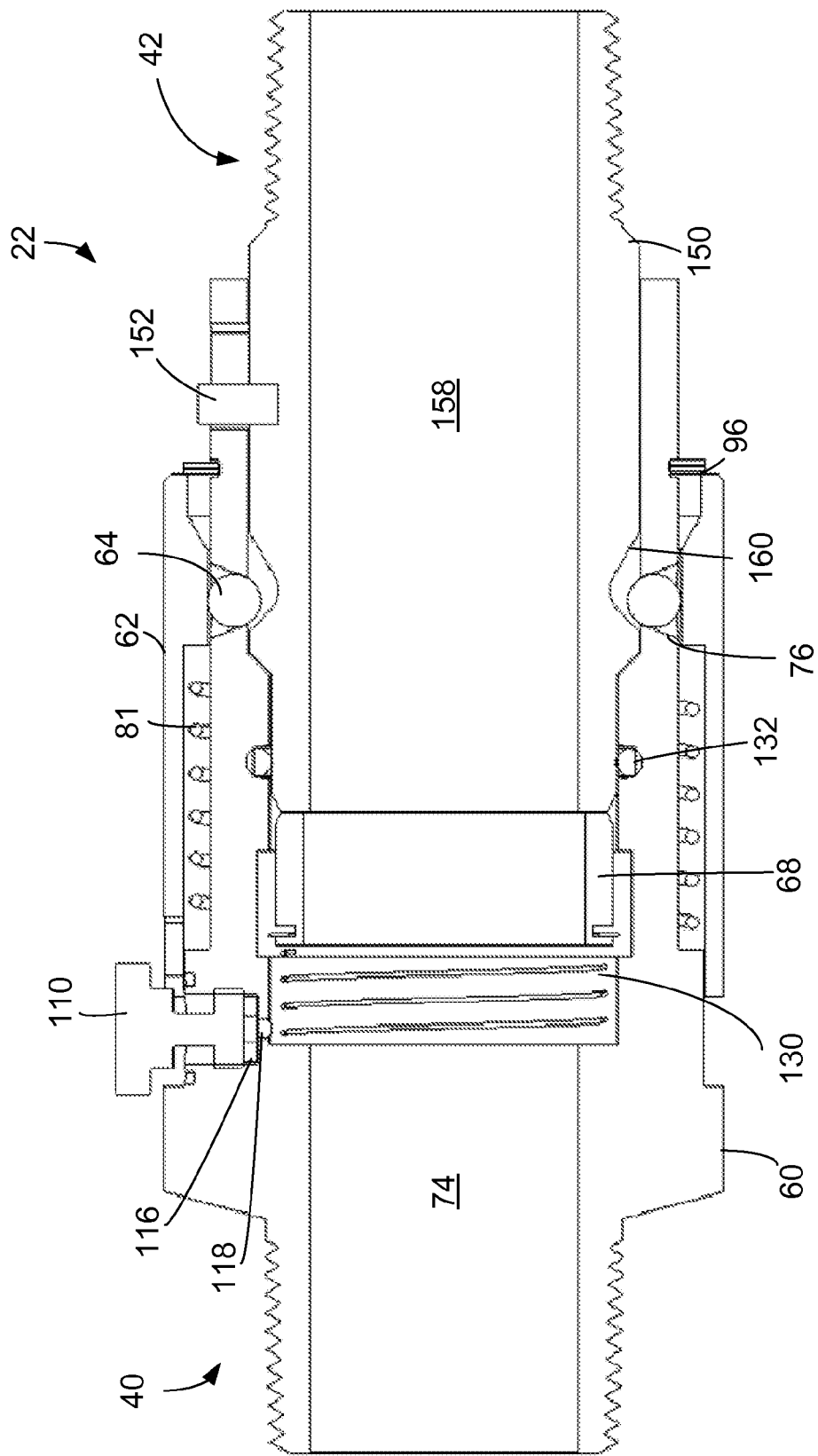
FIG. 6 is a cross-sectional view of the exemplary coupler taken about line 6-6 in FIG. 2.

Referring to the release sleeve 62 in detail, the release sleeve 62 surrounds the body 60 at the circumferentially spaced openings 76 and is movable between first and second positions relative to the body 60. The release sleeve 62 is biased in the first position as shown in FIG. 6 by a resilient member 81, such as a spring, which is seated by spring seat 82 extending outward from the body 60 and a spring seat formed by a backside of a ledge 84 projecting radially inwardly from an inner circumferential surface 86 of the release sleeve 62.

The release sleeve 62 is retained on the body 60 at an axially outer end 90 of the release sleeve 62 by a ledge 92 extending outward from the body 60 and at an axially inner end 94 of the release sleeve 62 by a retainer 96, which may be any suitable retainer, such as an annular retainer disposed in a groove 98 of the body 60. When the release sleeve 62 is in the first position, the axially inner end 94 of the release sleeve 62 abuts the retainer 96, thereby preventing the release sleeve from advancing further towards the male coupler 42. When the release sleeve 62 is in the second position, the ledge 92 can serve as a stop to prevent the release sleeve from advancing past the ledge 92.

Referring to the plurality of detents 64 in detail, the detents 64 may be any suitable detent, such as detent balls respectively received in the plurality of circumferentially spaced openings 76. When the release sleeve 62 is in the first position, the radially inwardly projecting ledge 84 urges the plurality of detents 64 radially inwardly. The release sleeve 62 is in the first position when the female and male couplers 40 and 42 are disconnected and after the female and male couplers have been connected.

Figure 5:
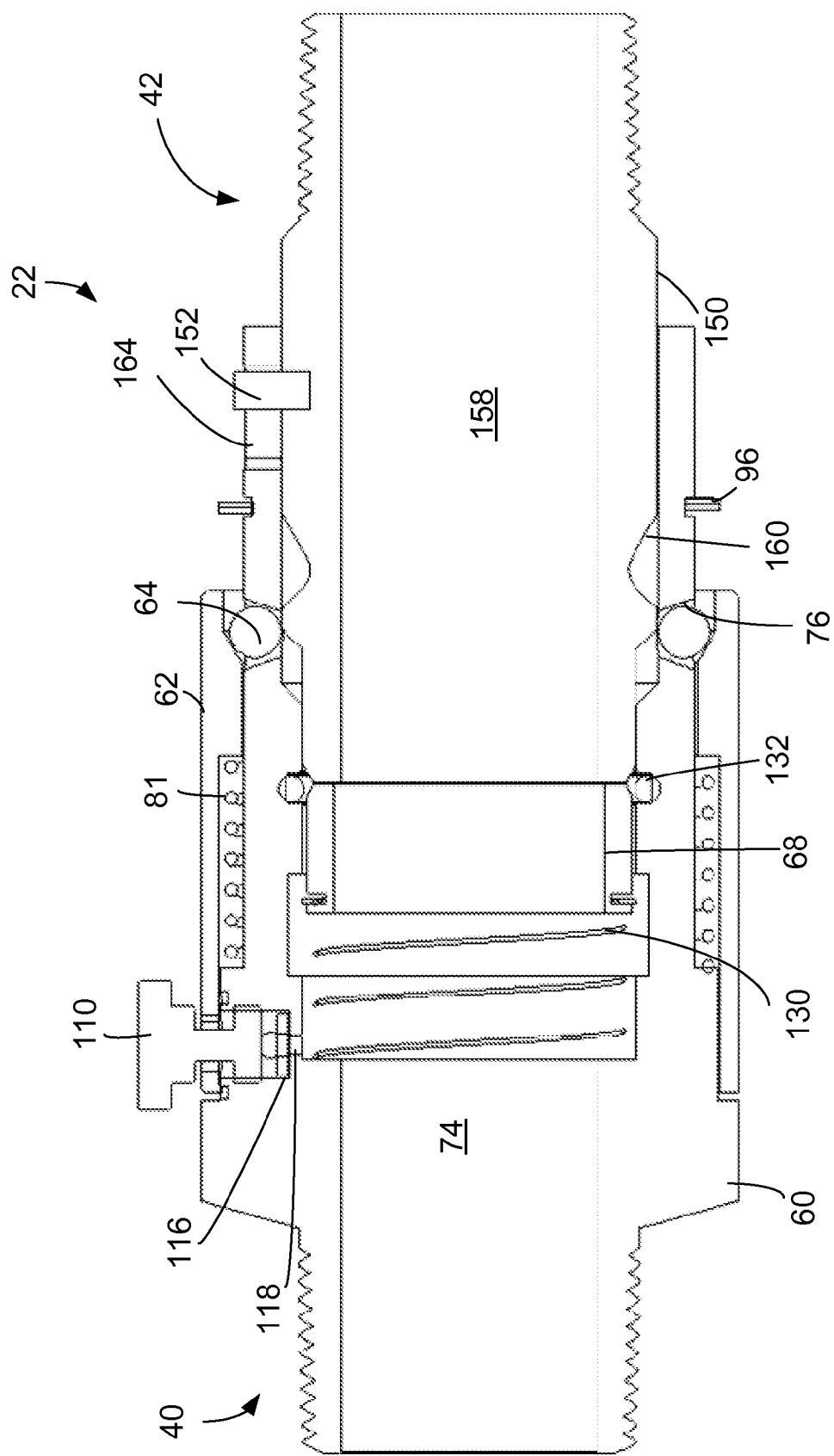
FIG. 5 is a cross-sectional view of the exemplary coupler showing the male coupler partially inserted into the female coupler.

When the release sleeve 62 is in the second position shown in FIGS. 4 and 5, the ledge 84 is moved axially away from the plurality of openings 76, allowing the plurality of detents 64 to be moved radially outwardly, thereby allowing the male coupler 42 to be inserted into the axially extending cavity 74 to the connected position. The release sleeve 62 can then be released, allowing it to be moved back to the first position by the resilient member 81 to engage the plurality of detents 64 with the male coupler 42, thereby coupling the female and male couplers 40 and 42.

Referring to the release valve 66 in detail, the release valve 66 includes a release valve member 110, such as a bleed screw coupled to the body 60 in any suitable manner, such as by threads 112 that engage threads in an opening 114 in the body 60, and a valve seat 116 in the body 60. The release valve member 110 is movable in the opening 114 relative to the valve seat 116, for example by threading the release valve member 110 towards and away from the valve seat 116. The valve seat 116 may be formed by a portion of the body, by a suitable disc, such as a polytetrafluoroethylene disc as shown in FIG. 4, etc.

The release valve member 110 is movable relative to the valve seat 116 between a closed position abutting the valve seat 116 to block communication between the axially extending cavity 74 and the passage 80, and an open position away from the valve seat 116 to allow for venting of fluid from the axially extending cavity 74 to the passage 80 allowing fluid to flow to the atmosphere. A passage 118 may be provided in the body 60 between the cavity 74 and the passage 80 for allowing fluid to flow from the cavity 74 to the passage 80. As shown, the passage 118 extends through a center of the disc that serves as the valve seat 116 and the passage 80 extends through the wall 78 of the body 60 perpendicular to a longitudinal axis of the body 60.

When the release valve member 110 is in the closed position, the release valve member 110 serves as a stop to prevent the release sleeve 62 from being moved to the second position, for example when pressure is trapped in the cavity 74, and when the release valve member 110 is in the open position to vent pressure from the cavity 74, the release sleeve 62 is movable to the second position. In this way, the female and male couplers 40 and 42 are prevented from separating under pressure.

The release valve member 110 includes a first portion 120 having a first diameter and a second portion 122 having a second diameter greater than the first diameter. The release sleeve 62 includes a slot 124 having a width greater than the first diameter but less than the second diameter. When the release valve member 110 is in the closed position, the second portion 122, which is larger than the slot 124, serves as the stop to prevent the release sleeve 62 from being moved to the second position. When the release valve member 110 is in the open position, the slot 124 receives the first portion 120 as the release sleeve 62 moves to the second position.

Referring to the sliding sleeve 68 in detail, the sliding sleeve 68 is disposed in the axially extending cavity 74 and biased in a first position by a resilient member 130, such as a spring. The sliding sleeve 68 may be made of any suitable material, such as polytetrafluoroethylene. The sliding sleeve 68 is configured to at least substantially cover a seal 132, such as an o-ring, in the first position to prevent the seal 132 from falling out of the female coupler 40 when disconnected from the male coupler 42 and to prevent debris from damaging the seal 132. The seal 132 may be disposed in the axially extending cavity 74, such as in a seal groove 134 in an inner circumferential surface of the body 60.

The sliding sleeve 68 is movable in the cavity 74 between the first position shown in FIG. 4 and a second position shown in FIG. 6 to uncover the seal 132 to allow for sealing between the female and male couplers 40 and 42. The sliding sleeve 68 is retained in the cavity 74 in any suitable manner, such as by a retainer 136, such as a c-shaped retainer ring, which is disposed in a groove 138 in an outer wall of the sliding sleeve 68. When the sliding sleeve 68 is in the first position, the retainer 136 abuts a ledge 140 projecting radially inwardly from the body 60 in the axially extending cavity 74. The ledge 140 prevents the sliding sleeve 68 from advancing further towards the axially inner end 70, thereby preventing the seal 130 from being uncovered when the female and male couplers 40 and 42 are disconnected.

With continued reference to FIGS. 2-4, the male coupler 42 includes a body 150 and an anti-rotate element 152 to constrain the male coupler 42 against rotation with respect to the female coupler 40 when connected. The body 150 has an axially inner end 154 configured to be received in the axially extending cavity 74 of the female coupler 40, an axially outer end 156, and an axially extending cavity 158 in fluidic communication with the axially extending cavity 74 when the female and male couplers 40 and 42 are connected.

The body 150 also includes a detent recess 160, such as an annular channel in an outer surface 162 of the body 150 near the axially inner end 154. To couple the female and male couplers 40 and 42, the plurality of detents 64 of the female coupler 40 are urged radially inwardly into the detent recess 160. It will be appreciated that the detent recess 160 is preferably a continuous annular channel, however, it will be appreciated that the detent recess 160 may be any suitable recess or recesses, such as a plurality of recesses for receiving respective detents 64.

Referring to the anti-rotate element 152 in detail, the anti-rotate element 152, which may be a pin, projects radially outwardly from the body 150 of the male coupler. The anti-rotate element 152 may be coupled to the body 150 in any suitable manner or may be formed integrally with the body 150. As the female and male couplers 40 and 42 are connected, the anti-rotate element 152 is received in a notch 164 at the axially inner end 70 of the body 60 of the female coupler 40 to constrain the male coupler 42 against rotation.

As shown, the notch 164 includes multiple portions through which the anti-rotate element 152 is configured to be moved through as the male and female couplers 40 and 42 are connected. For example, the notch 164 may include a first portion parallel to the longitudinal axis of the body 60 into which the anti-rotate element 152 is introduced, a second portion perpendicular to the first portion through which the anti-rotate element 152 is advanced, and a third portion extending perpendicular to the first portion in a direction away from the axially inner end 70. Accordingly, the notch 164 may be substantially z-shaped. The notch 164 forms a ledge 166 that prevents separation of the female and male couplers 40 and 42 without a secondary action.

The anti-rotate element 152 is moveable between a release position, an intermediate position in the second portion of the notch 164, and a locked position in the third portion of the notch 164. When in the locked position, pressure in the cavities 74 and 158 may cause the male coupler 42 to move along the third portion of the notch 164 to the intermediate position until the anti-rotate element 152 contacts the ledge 166. The ledge 166 prevents separation of the female and male couplers 40 and 42 due to the pressure in the cavities 74 and 158, and the notch 164 allows the pressure to be bled therethrough.

By constraining the male coupler 42 against rotation with respect to the female coupler 40, the anti-rotate element 152 prevents or substantially prevents wear on the seal 132, for example during turns of the vehicle. The anti-rotate element 152 and the notch 164 may be sized to eliminate essentially all relative rotation; however, it will be appreciated that the anti-rotate element 152 and the notch 164 may be sized to constrain the male coupler 42 while allowing some rotation.

Referring now to a method of connecting the female and male couplers 40 and 42, as noted above, when the female and male couplers 40 and 42 are disconnected as shown in FIGS. 3 and 4, the release sleeve 62 is in the first position as shown in FIG. 6, the sliding sleeve 68 is in the first position as shown in FIG. 4, and the release valve member 110 is in the open position as shown in FIG. 4. To connect the female and male couplers 40 and 42, the release sleeve 62 is moved to the second position and the male coupler 42 is inserted into the axially extending cavity 74 in the body 60. As the male coupler 42 is advanced, the outer surface 162 of the male coupler 42 urges the plurality of detents 64 radially outwardly as shown in FIG. 5 until the detent recess 160 is aligned with the plurality of detents 64 as shown in FIG. 6. When the detent recess 160 is aligned with the plurality of detents 64, the release sleeve 62 is moved to the first position by the resilient member 81 to urge the detents 64 radially inwardly into the detent recess 160 to couple the female and male couplers 40 and 42. Once the plurality of detents 64 are in the detent recess 160, the ledge 84 prevents the detents 64 from being moved out of the recess 160.

As the male coupler 42 is inserted into the axially extending cavity 74, the axially inner end 154 of the male coupler 42 comes into contact with an axially inner end 170 of the sliding sleeve 68 and begins to move the sliding sleeve 68 against the force of the resilient member 130 to the second position. As shown in FIG. 5, the male coupler 42 has moved the sliding sleeve 68 to a location between the first position and the second position where the seal 132 is partially uncovered. When the male coupler 42 has been advanced to the point that the plurality of detents 64 are urged into the detent recess 160, the sliding sleeve 68 will be in the second position shown in FIG. 6, at which point the seal 132 is covered by the male coupler 42 to provide sealing between the female and male couplers 40 and 42.

Moreover, as the male coupler 42 is inserted into the axially extending cavity 74, the anti-rotate element 152 is received in the notch 164. The anti-rotate element is first advanced through the first portion of the notch 164 as shown in FIG. 5. The male coupler 42 is then rotated in a direction perpendicular to the longitudinal axis of the female coupler 40 to advance to anti-rotate element 152 through the second portion of the notch 164. The male coupler 42 is then moved further into the axially extending cavity 74 through the third portion of the notch 164. When the male coupler 42 is at an end of the third portion of the notch 164 as shown in FIG. 6, the sliding sleeve 68 will be in the second position and the detents 64 in the recess 160.

Once the female and male couplers 40 and 42 are connected, the release valve member 110 is moved to the closed position shown in FIG. 6. In the closed position, the release valve member 110 prevents the release sleeve 62 from moving to the second position, thereby preventing separation under pressure. The release valve member 110 also closes the fluid path from the axially extending cavity 74 to the passage 80 to prevent fluid from exiting through the passage 80 when the couplers are connected.

To disconnect the male and female couplers 40 and 42, the release valve member 110 is moved to the open position shown in FIG. 4 to allow pressure to be vented through the passage 80 and to allow the release sleeve 62 to be moved to the second position. When the release sleeve 62 is in the second position, the detents 64 can be moved radially outwardly as the male coupler 42 is withdrawn from the axially extending cavity 74. As the male coupler 42 is withdrawn, any remaining pressure may be bled through the passage 80 and/or notch 164. The male coupler 42 is rotated to move through the second portion of the notch 164 and then moved axially through the first portion of the notch 164 to disconnect the female and male couplers 40 and 42. Also, as the male coupler 42 is withdrawn, the sliding sleeve 68 moves to the first position at least substantially covering the seal 132, so that, for example, if the female coupler 40 is attached to a hose that is pulled across the ground, the seal 132 is prevented from falling out and debris is prevented from damaging the seal 132.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A female coupler including:
   a body having axially inner and axially outer ends, an axially extending cavity for receiving a male coupler at the inner end, a plurality of circumferentially spaced openings extending through a wall of the body near the inner end, and a passage extending through the wall of the body near the outer end;
   a release sleeve surrounding the body at the circumferentially spaced openings and being movable between first and second positions relative to the body;
   a plurality of detents respectively received in the plurality of circumferentially spaced openings and being urged radially inwardly by the release sleeve when the release sleeve is in the first position and being movable radially outwardly when the release sleeve is in the second position; and
   a release valve having a release valve member movable relative to a valve seat in the body, the release valve member being movable between a closed position blocking communication between the axially extending cavity and the passage and an open position allowing for venting of fluid from the axially extending cavity to the passage,
   wherein the release valve member serves as a stop to prevent the release sleeve from being moved to the second position when the release valve member is in the closed position.

2. The female coupler according to claim 1, wherein when the release valve member is in the open position, the release sleeve is movable to the second position.

3. The female coupler according to claim 1, further including a disc that serves as the valve seat.

4. The female coupler according to claim 1, wherein the release valve member includes threads that mate with threads in an opening in the body.

5. The female coupler according to claim 1, wherein the passage extends through the wall of the body perpendicular to a longitudinal axis of the body.

6. The female coupler according to claim 1, further including:
   a seal disposed in a seal groove in the axially extending cavity; and
   a sliding sleeve disposed in the axially extending cavity, wherein the sleeve is biased in a first position substantially covering the seal and movable to a second position by the male coupler to uncover the seal.

7. The female coupler according to claim 6, further including a retainer disposed in a groove in the sliding sleeve, wherein the retainer retains the sliding sleeve in the cavity.

8. The female coupler according to claim 7, wherein the body of the female coupler includes a ledge in the axially extending cavity, and wherein the retainer abuts the ledge in the first position to retain the sliding sleeve in the cavity.

9. The female coupler according to claim 6, further including a resilient member biasing the sleeve in the first position.

10. A male coupler in combination with the female coupler according to claim 1, the male coupler including:
    a body having:
        an axially inner end configured to be received in the cavity of the female coupler and an axially outer end;
        an axially extending cavity;
        a detent recess on an outer surface of the body near the axially inner end into which the detents of the female coupler are urged radially inwardly into to couple the female and male couplers; and
    an anti-rotate element to constrain the male coupler against rotation with respect to the female coupler.

11. The combination according to claim 10, wherein the body of the female coupler includes a notch at the inner end that receives the anti-rotate element.

12. The combination according to claim 11, wherein the anti-rotate element is movable to an intermediate position in the notch between a locked position and a released position, and wherein separation of the male coupler from the female coupler due to pressure in the axially extending cavities is prevented when in the intermediate position.

13. The combination according to claim 12, wherein in the intermediate position fluid in the axially extending cavities is bled through the notch.

14. The combination according to claim 10, wherein the anti-rotate element is movable between a locked position and a released position, wherein in the locked position the male coupler is constrained against rotation and in an intermediate position between the locked and released positions the male coupler is prevented from moving away from the female coupler in a direction parallel to a longitudinal axis of the male coupler.

15. A female coupler including:
    a body having axially inner and axially outer ends, an axially extending cavity for receiving a male coupler at the inner end, a plurality of circumferentially spaced openings extending through a wall of the body near the inner end, and a passage extending through the wall of the body near the outer end;
    a release sleeve surrounding the body at the circumferentially spaced openings and being movable between first and second positions relative to the body;
    a plurality of detents respectively received in the plurality of circumferentially spaced openings and being urged radially inwardly by the release sleeve when the release sleeve is in the first position and being movable radially outwardly when the release sleeve is in the second position; and a release valve having a release valve member movable relative to a valve seat in the body, the release valve member being movable between a closed position blocking communication between the axially extending cavity and the passage and an open position allowing for venting of fluid from the axially extending cavity to the passage, wherein the release valve member includes a first portion having a first diameter and a second portion having a second diameter greater than the first diameter, and the release sleeve includes a slot having a width greater than the first diameter but less than the second diameter.

16. The female coupler according to claim 15, wherein when the release valve member is in the closed position the second portion serves as a stop to prevent the release sleeve from being moved to the second position, and when the release valve member is in the open position the slot receives the first portion as the release sleeve moves to the second position.

17. A female coupler comprising:

a body having an axially extending cavity for receiving the male coupler at a receiving end and a passage extending through the body spaced from the receiving end, a locking mechanism disposed at the receiving end of the body at an interior surface of the body defined by the axially extending cavity for engaging with and restraining the male coupler at least partially within the axially extending cavity, a release sleeve surrounding the body at the receiving end for engaging the locking mechanism, the release sleeve being movable along the body between a locking position engaged with the locking mechanism to prevent removal of the male coupler from the axially extending cavity and a releasing position disengaged from the locking mechanism to allow removal of the male coupler from the axially extending cavity, and a release valve having a release valve member movable relative to a valve seat in the body, the release valve member being movable between a closed position blocking communication between the axially extending cavity and the passage and an open position allowing for venting of fluid from the axially extending cavity to the passage, wherein the release valve member prevents movement of the release sleeve from the locking position to the releasing position when the release valve member is in the closed position.

18. The female coupler according to claim 17, wherein the female coupler further includes a seal disposed in a seal groove in the axially extending cavity; and a sliding sleeve disposed in the axially extending cavity, wherein the sleeve is biased in a first position substantially covering the seal and movable to a second position by the male coupler to uncover the seal.

19. The female coupler according to claim 17, in combination with a male coupler including a body having a received end received in the axially extending cavity of the female coupler, and a locking structure for engaging with the locking mechanism of the female coupler.

20. The female coupler in combination with a male coupler according to claim 19, wherein the female coupler and the male coupler each include anti-rotate elements cooperatively engageable with one another to constrain the male coupler against rotation with respect to the female coupler.

* * * * *